United States Patent Office 3,011,989
Patented Dec. 5, 1961

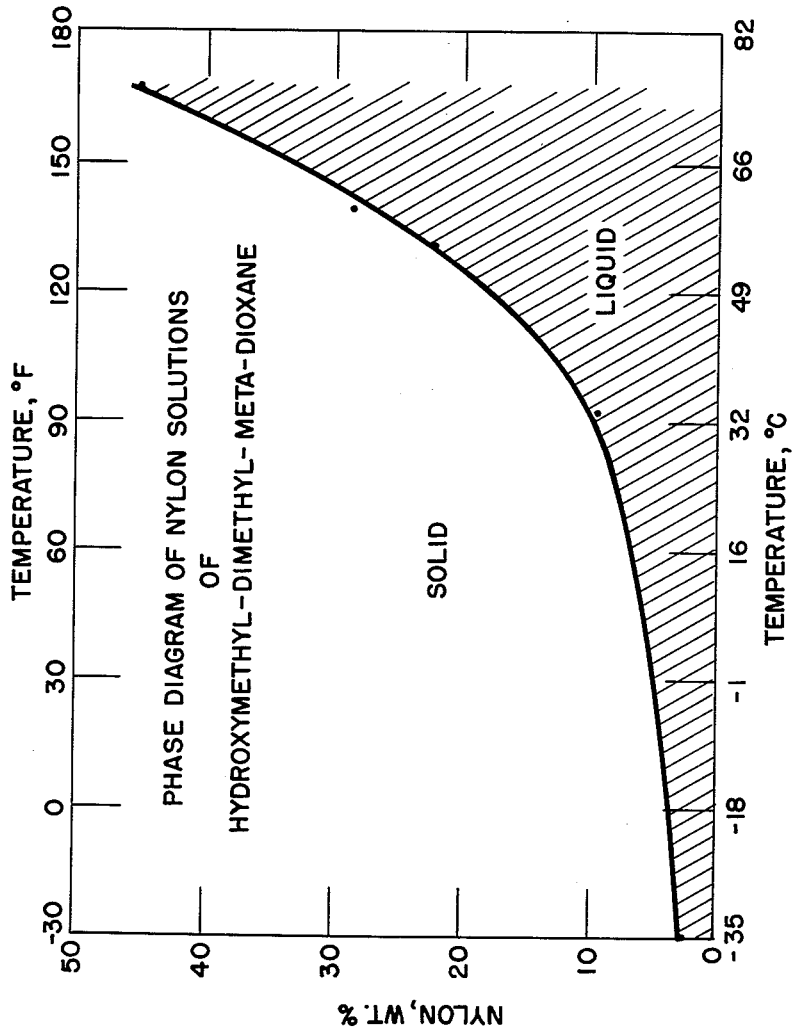

3,011,989
METHOD OF PREPARING A HOMOGENEOUS SOLUTION OF A POLYAMIDE IN A HYDROXYMETHYL - DIMETHYL - META - DIOXANE SOLVENT AND COMPOSITIONS THEREOF
Donald H. Russell, Pennsauken, N.J., assignor to The Atlantic Refining Company, Philadelphia, Pa., a corporation of Pennsylvania
Filed Apr. 10, 1961, Ser. No. 103,677
7 Claims. (Cl. 260—30.4)

This application is a continuation-in-part of application Serial No. 784,548, filed January 2, 1959, now abandoned.

This invention relates to novel homogeneous nylon compositions. More particularly, this invention relates to novel homogeneous nylon compositions comprising a mixture of a nylon with a hydroxymethyl-dialkyl-meta-dioxane.

Nylon is a generic term for any long chain synthetic polymeric amide which has recurring amide groups as an integral part of the main polymer chain and which is capable of being formed into a filament in which the structural elements are oriented in the direction of the axis. (See Chemistry of Commercial Plastics by R. L. Wakeman, Reinhold Publishing Company, 1947.)

A great number of different types of nylon are known, however, only a limited number have achieved commercial acceptance. These include polymers prepared from (1) Hexamethylene diamine and adipic acid (polyhexamethylene adipamide)
(2) Epsilon-caprolactam (polyepsilon caprolactam)
(3) Hexamethylene diamine and sebacic acid (polyhexamethylene sebacamide)
(4) Hexamethylene diamine, epsilon-caprolactam, adipic acid and sebacic acid (copolymer) (polyhexamethylene adipamide-sebacamide)
(5) Hexamethylene diamine and adipic acid modified with formaldehyde and methanol These nylons provide a range of polymer types which vary greatly in their properties and utilities. They range from liquids to high-melting crystalline solids and find use as fibers, filaments, films, extrusions, moldings, castings, adhesives, surface coatings, modifiers, and lacquers.

Even though nylon polymers have many advantages and are extremely versatile in certain of their applications, the commercial growth of volume production of nylon has not been as rapid as that of vinyl polymers and polyethylene. One theory that has been advanced to substantiate the apparent lack of commercial acceptance of nylon is its inherent chemical inertness and its insolubility in most solvent materials. While it is true that chemical inertness and insolubility of nylon are desirable properties in certain instances, there are many uses to which nylon could be applied if it could be dissolved in quantity in a suitable solvent. For example, if solutions of nylon could be produced, it would then be possible to "wet spin" the nylon into fibers and filaments more economically; it would be possible to produce a powdered nylon more economically; and there would be a more widespread use of nylon lacquers.

At the present time, nylon is considered soluble in only a few solvents such as phenol, cresols, and dimethyl formamide (DMF). Nylon in general is scarcely attacked by other solvents and is soluble only to the extent of about one percent by weight in materials such as crotyl phenol, sec-amyl phenol, o-allylphenol, glycerol mono- and dichlorohydrin, ethylene bromo- and chlorohydrin, acetic acid, lactic acid, thioglycolic acid, 2,3-dibromopropane and phenylethyl alcohol.

Even with those materials in which nylon is considered soluble (i.e. phenol, cresols, and DMF), it is possible to form difficult workable solutions of only about 20 percent by weight nylon in DMF and about 30 percent by weight nylon in phenol and cresols. In forming solutions of nylon in these solvents, relatively high temperatures must be used and if temperatures above the softening or melting point of the nylon are used, it tends to break down and discolor unless the solubilizing procedure is conducted in an atmosphere of an inert gas. In addition, at temperatures above its softening points, nylon exhibits poor workability and offers extreme resistance to processing on conventional equipment such as roll mills, calendars, Banbury mixers, extruders, etc. As a result, even the few compounds which are compatible with nylon, in general, do not markedly improve the workability of the nylon.

In addition to the limited solubility of nylon in known solvents therefor (i.e. phenol, cresols, and DMF), these solvents possess other properties which make them undesirable materials to be used in certain phases of the processing of nylon. For example, DMF is toxic and has an objectionable odor, and phenol and cresols are not only toxic and odoriferous, but also are extremely corrosive. Obviously a material which is non-toxic, non-corrosive, relatively odorless, and is miscible in all proportions with nylon would be extremely desirable.

Homogeneous mixtures of nylon and such a material form the basis for this invention.

It is an object of this invention to provide a homogeneous nylon composition comprising a mixture of a nylon and a solvent.

It is another object of this invention to provide a homogeneous nylon composition comprising a mixture of a nylon and a solvent wherein the nylon and the solvent are miscible in all proportions.

It is another object of this invention to provide novel nylon lacquers.

Other objects of this invention will become apparent to those skilled in the art from the following description.

These and other objects are accomplished by incorporating nylon in a hydroxymethyl-dialkyl-meta-dioxane.

It has been found that nylon is completely miscible with hydroxymethyl-dialkyl-meta-dioxanes, particularly hydroxymethyl-dimethyl-meta-dioxanes. The hydroxymethyl-dimethyl-meta-dioxane can function either as a solvent to dissolve the nylon or it can act as a plasticizer to plasticize the nylon. Therefore, the hydroxymethyl-dimethyl-meta-dioxane may be considered as not only a solvent for the nylon but also as a plasticizer and thus may be designated as a "solvent-plasticizer."

"Solvent-plasticizers" have been defined as high boiling, relatively non-volatile liquids which when used in large amounts act as a solvent for a polymer and when used in relatively small amounts, relative to the quantity of polymer, function to soften or plasticize the polymer.

As stated above, there is a great diversity in the different types of nylons. This is dependent upon choice of starting materials, degree of reaction, later modification through other chemical reactions and combinations or alloying of nylon with other nylons. The more common types of nylon commercially available today are known as nylon 66, prepared by the condensation of hexamethylene diamine and adipic acid; nylon 610, prepared from hexamethylene diamine and sebacic acid; and nylon 6, prepared by thermal polymerization of epsilon-aminocaproic acid or caprolactam.

Identification of the different types of nylon is made possible by a numbering system which is an abbreviated description of the materials used in the preparation of the particular nylon.

Where there is only one number it indicates that the nylon was prepared from a single monomeric material. The number indicates the number of carbon atoms in the linear chain of the recurring polymer units. Thus, a nylon prepared from a lactam would be designated by a single number, i.e. nylon 6, indicating a nylon prepared from a 6 carbon epsilon-aminocaproic acid or caprolactam. Where there are two numbers, two reactants (usually a dibasic acid and a diamine or their equivalents) have been used in forming the nylon. The first number represents the number of carbon atoms in the chain of the diamine and the second indicates the number of carbon atoms in the dibasic acid chain, i.e. nylon 66 describes a nylon prepared from a diamine containing 6 carbon atoms and a dibasic acid containing 6 carbon atoms; nylon 610 describes a nylon prepared from a diamine containing 6 carbon atoms and a dibasic acid containing 10 carbon atoms.

In copolymer nylons the major constituents are given first by numbers, and diagonal lines are used to separate the minor constituents, for example, nylon 66/610/6 describes a copolymer nylon prepared from a major portion of hexamethylene diamine and adipic acid and successively smaller portions of hexamethylene diamine and sebacic acid and finally of epsilon-caprolactam. The percentage composition of the nylon may be shown in parentheses.

It has now been discovered that nylon as defined herein may be dissolved in or plasticized by hydroxymethyl-dialkyl-meta-dioxanes, particularly hydroxymethyl-dimethyl-meta-dioxanes.

The hydroxymethyl-dimethyl-meta-dioxanes used in this invention may be prepared in any convenient manner. For example, they occur as by-products in the condensation of $C_4$ olefins with formaldehyde or paraformaldehyde in the presence of sulfuric acid as a catalyst.

The crude product resulting from the reaction of either isobutylene or butene-2 or both with formaldehyde contains, along with the primary products of 4,4-dimethyl-meta-dioxane and 4,5-dimethyl-meta-dioxane, various by-products resulting from these reactions along with some unreacted materials. Among the by-products are found small amounts of hydroxymethyl-dimethyl-meta-dioxanes. Thus in the production of 4,4-dimethyl-meta-dioxane from the reaction of isobutylene with formaldehyde there is also formed a small amount of 5-hydroxymethyl-4,4-dimethyl-meta-dioxane. Similarly in the reaction of butene-2 with formaldehyde, there is also formed some 4-hydroxymethyl-4,5-dimethyl-meta-dioxane or 5-hydroxymethyl-4,5-dimethyl-meta-dioxane or both. In the reaction of both isobutylene and butene-2 with formaldehyde all three position isomers will be formed in small amounts.

Upon vacuum fractional distillation of the products, resulting from the condensation of isobutylene and formaldehyde in the presence of dilute sulfuric acid, that material boiling from about 78° C. to about 124° C. at 10 mm. of mercury pressure was found to contain appreciable amounts of 5-hydroxymethyl-4,4-dimethyl-meta-dioxane. This cut was further vacuum fractionally distilled at 10 mm. of mercury pressure and that portion boiling from about 115° C. to about 122° C. upon analysis was found to contain about 80 percent by weight 5-hydroxymethyl-4,4-dimethyl-meta-dioxane. The material boiling between 115° C. and 122° C. was redistilled at 10 mm. of mercury pressure and a portion boiling at about 118° C. was analyzed as being about 100 percent by weight 5-hydroxymethyl-4,4-dimethyl-meta-dioxane.

It will be understood that the above method for preparing hydroxymethyl-dimethyl-meta-dioxanes is but one of several ways in which these materials may be prepared. (See "Dual Reactivity in the Reaction of Olefins with Aldehydes," by M. I. Farberov, Doklady Akad. Nauk, SSSR, vol. 110, pp. 1005–1008, 1956.) It is important, however, that for the purposes of this invention, that regardless of the method of its preparation, the hydroxymethyl-dimethyl-meta-dioxane displaying a solvent-plasticizing effect on nylon should possess physical properties in accordance with those set forth above.

Since the hydroxymethyl-dimethyl-meta-dioxanes may be considered as either solvents for or plasticizers for nylon, it is readily apparent that nylon is compatible with this material in all proportions. For example, it is possible to dissolve up to 50 percent by weight nylon in the hydroxymethyl-dimethyl-meta-dioxane and retain a solution having a workable viscosity. In this respect the hydroxymethyl-dimethyl-meta-dioxane would act as a solvent for the nylon. If, however, a mixture of 90 percent by weight nylon and 10 percent by weight hydroxymethyl-dimethyl-meta-dioxane were admixed, the resulting product would be a gel or semi-solid and in this instance the hydroxymethyl-dimethyl-meta-dioxane would act as a plasticizer for the nylon.

Another advantage attendant to the use of hydroxymethyl-dimethyl-meta-dioxane as a plasticizer for nylon relates to the hygroscopic properties of the hydroxymethyl-dimethyl-meta-dioxane. It is well known that nylon is quite sensitive to water vapor contained in the air. As nylon tends to desorb water its flexibility and general mechanical properties are somewhat impaired. Therefore, the ability of a plasticizer for nylon to be selectively hygroscopic or to possess a high tolerance for water is of the utmost importance. Since hydroxymethyl-dimethyl-meta-dioxanes will dissolve water to the extent of 45 percent by weight, the use of such compounds as a plasticizer for nylon functions not only as a selective adsorber but also as a stabilizer of the nylon with regard to its physical properties.

In the following table certain physical properties of hydroxymethyl-dimethyl-meta-dioxane and dimethyl formamide and cresol are presented and compared.

TABLE I

|  | Hydroxymethyl-dimethyl-meta-dioxane | Dimethyl Formamide | Cresols |
| --- | --- | --- | --- |
| Boiling Range (° C.) | 115–122 (at 10 mm. mercury pressure). | 153 | 191–204. |
| Flash Point (° C.) | 127 | 67 | 99. |
| Weight Percent Nylon Soluble.[1] | ~50 | ~30 | ~20. |
| Corrosivity | None observed. | Slightly corrosive. | Corrosive. |
| Toxicity | None reported | Toxic | Toxic. |
| Odor | None noticeable even at 150° C. | Strong at room temperature. | Strong at room temperature. |

[1] Solutions of workable viscosity.

In the above table it is clearly shown that the physical properties of hydroxymethyl-dimethyl-meta-dioxane with respect to corrosivity, toxicity and odor are far superior to those possessed by both dimethyl formamide and cresols. It is also shown that it is possible to dissolve more than twice as much nylon in hydroxymethyl-dimethyl-meta-dioxane as in cresols and more than one and one-half times as much nylon in hydroxymethyl-dimethyl-meta-dioxane as in dimethyl formamide and still retain a solution of workable viscosity.

The following examples are intended as illustrative and are not to be construed as limitative of the scope of this invention.

*Example 1*

In FIGURE I there is shown a relationship between the weight percent of nylon [polyhexamethylene adipamide (polymer derived from hexamethylene diamine and adipic acid and having a melting point of 263° C.)] dissolved in 5-hydroxymethyl-4,4-dimethyl-meta-dioxane and the temperature (given both in degrees Fahrenheit and degrees centigrade). This curve was constructed by preparing seven different concentrated solutions varying from 2.5 weight percent to 45 weight percent polyhexamethylene adipamide. Polyhexamethylene adipamide will not dissolve in 5-hydroxymethyl-4,4-dimethylmeta-dioxane at room temperature but begins to dissolve when the solution is heated to about 120° C.–130° C. As the temperature is raised to about 150° C.–180° C. the polyhexamethylene adipamide goes into solution rapidly and it is at this temperature that the maximum solvent power and rate of solution is obtained. There is formed a translucent fluid solution. As the more concentrated solutions of polyhexamethylene adipamide cool, they tend to solidify or gel in accordance with the curve shown in FIGURE I. In other words, in the shaded portion of the graph the polyhexamethylene adipamide-5-hydroxymethyl-4,4-dimethyl-meta-dioxane mixture will be a free flowing liquid, whereas above the curve the mixture will be a solid or semi-solid. It has been found, however, that at temperatures below the boiling point of the solvent, it is not possible to produce free-flowing liquid solutions containing more than about 50 percent polyhexamethylene adipamide by weight. At concentrations above about 50 percent polyhexamethylene adipamide by weight the compositions are solid and can best be described as plasticized polyhexamethylene adipamides.

*Example II*

Polyhexamethylene adipamide and polyepsilon caprolactam are commercially available usually in the form of pellets about twice the size of a grain of rice. In many applications, it is desirable to have nylon in the form of a fine powder for use as fluidized coatings and rapid melting powders for shorter heating cycles. Finely divided powdered nylon was prepared by preciptating polyepsilon caprolactam (melting point 220° C.) from a 10 percent by weight solution of polyepsilon caprolactam in 5-hydroxymethyl-4,4-dimethyl-meta-dioxane by adding the solution to a large excess of acetone. Since the two solvents are mutually compatible the precipitated powder was separated by filtration. The precipitate was further washed with three successive 100 cc. portions of acetone. The powder, wet with acetone, was allowed to air dry for one hour and placed in a vacuum oven at 150° F. for two hour. On removal from the oven there was recovered a finely divided dry powdered polyepsilon caprolactam.

The 5-hydroxymethyl-4,4-dimethyl-meta-dioxane was recovered by evaporating the acetone therefrom on a steam bath.

*Example III*

A clear nylon lacquer was prepared by coating a steel panel with a 20 percent by weight solution of polyhexamethylene adipamide (melting point 263° C.) in 5-hydroxymethyl-4,5-dimethyl-meta-dioxane. The steel panel was baked at about 400° F. for approximately one hour. Upon removal from the oven the resulting film was found to be extremely tightly adhered to the panel. This film resisted cutting with a knife blade, had excellent impact resistance in that it did not crack when struck with a hammer and the steel panel could be bent through an angle of 180 degrees without any noticeable damage to the film.

A similar test with polyepsilon caprolactam dissolved in 4-hydroxymethyl-4,5-dimethyl-meta-dioxane produced an equally tough flexible film on a steel panel.

*Example IV*

A sample of polyhexamethylene adipamide (melting point 263° C.) in a concentration of 10 percent by weight in 5-hydroxymethyl-4,4-dimethyl-meta-dioxane was extruded through an orifice into an acetone bath at room temperature. A strong continuous mono-filament was produced.

*Example V*

An attempt was made to dissolve polyhexamethylene adipamide (melting point 263° C.) using as a solvent an unfractionated portion of the product resulting from the reaction of isobutylene and formaldehyde in the presence of sulfuric acid. No noticeable solubilizing or plasticizing effect was observed even when heated to 150° C. for several hours.

*Example VI*

The corrosivity of 5-hydroxymethyl-4,4-dimethyl-meta-dioxane was tested with regard to stainless steel, black iron, copper, and lead. Two series of tests were performed. In the first series a sample of each metal was placed in a beaker with 5-hydroxymethyl-4,4-dimethyl-meta-dioxane and kept in sunlight at room temperature for 168 hours. In the second series of tests a different sample of each metal was placed in beakers of 5-hydroxymethyl-4,4-dimethyl-meta-dioxane and kept at 100° C. for 168 hours. The results of these tests are presented in Table II.

TABLE II

|  | 168 hours at room temperature— Sunlight | 168 hours at 100° C. |
| --- | --- | --- |
| Stainless Steel | None | None. |
| Black Iron | do | Do. |
| Copper | do | Slight tarnish after 144 hrs. |
| Lead | do | Slight attack after 144 hrs. |

It is clear from the above table that, for practical purposes, the corrosivity of 5-hydroxymethyl-4,4-dimethyl-meta-dioxane may be considered as nil.

It will be apparent from the foregoing examples that by controlling the concentration of the nylon in the hydroxymethyl-dimethyl-meta-dioxane solution, it is possible to produce free-flowing liquids for use in the production of powders, filaments or lacquers For example, in the preparation of lacquers, solutions containing from 5 to 25 percent nylon by weight are particularly preferred.

When concentrations of nylon above 50 percent are employed, the nylon becomes plasticized and may be extruded, calendered or milled according to conventional commercial practices. Moreover, during these operations various conventional ingredients such as dyes, pigments, fillers, resins and the like may be incorporated into the plasticized compositions.

I claim:

1. A homogeneous composition of matter comprising a mixture of a long chain synthetic polymeric amide which has recurring amide groups as an integral part of the main polymer chain and which is capable of being formed into a filament in which the structural elements are oriented in the direction of the axis and a hoydroxymethyl-dimethyl-meta-dioxane selected from the group consisting of 5-hydroxymethyl-4,4-dimethyl-meta-dioxane, 5-hydroxymethyl-4,5-dimethyl-meta-dioxane, and 4-hydroxymethyl-4,5-dimethyl-meta-dioxane.

2. A composition in accordance with claim 1 in which the long chain synthetic polymeric amide is selected from the group consisting of polyhexamethylene adipamide and polyepsilon caprolactam.

3. A lacquer composition comprising a mixture of from 5 percent by weight to 25 percent by weight of a long chain synthetic polymeric amide dissolved in a hydroxymethyl-dimethyl-meta-dioxane, said long chain synthetic polymeric amide having recurring amide groups as an integral part of the main polymer chain and being capable of being formed into a filament in which the structural elements are oriented in the direction of the axis, said hydroxymethyl-dimethyl-meta-dioxane being selected from the group consisting of 5-hydroxymethyl-4,4-dimethyl-meta-dioxane, 5-hydroxymethyl-4,5-dimethyl-meta-dioxane, and 4-hydroxymethyl-4,5-dimethyl-meta-dioxane.

4. A method for preparing homogeneous compositions of a long chain synthetic polymeric amide which has recurring amide groups as an integral part of the main polymer chain and which is capable of being formed into a filament in which the structural elements are oriented in the direction of the axis and a hydroxymethyl-dimethyl-meta-dioxane selected from the group consisting of 5-hydroxymethyl-4,4-dimethyl - meta - dioxane, 5-hydroxymethyl-4,5-dimethyl-meta-dioxane, and 4-hydroxymethyl-4,5-dimethyl-meta-dioxane which comprises heating a mixture of said long chain synthetic polymeric amide and said hydroxymethyl-dimethyl-meta-dioxane to a temperature of from 120° C. to 180° C. with agitation for a time sufficient to produce said homogeneous composition.

5. A method for preparing homogeneous compositions of a long chain synthetic polymeric amide which has recurring amide groups as an integral part of the main polymer chain and which is capable of being formed into a filament in which the structural elements are oriented in the direction of the axis and a hydroxymethyl-dimethyl-meta-dioxane selected from the group consisting of 5-hydroxymethyl-4,4-dimethyl - meta - dioxane, 5-hydroxymethyl-4,5-dimethyl-meta-dioxane, and 4-hydroxymethyl-4,5-dimethyl - meta - dioxane which comprises heating a mixture of said long chain synthetic polymeric amide and said hydroxymethyl-dimethyl-meta-dioxane to a temperature of from 150° C. to 180° C. with agitation for a time sufficient to produce said homogeneous composition.

6. A method for preparing homogeneous compositions of a long chain synthetic polymeric amide which has recurring amide groups as an integral part of the main polymer chain and which is capable of being formed into a filament in which the structural elements are oriented in the direction of the axis and a hydroxymethyl-dimethyl-meta-dioxane selected from the group consisting of 5-hydroxymethyl-4,4-dimethyl - meta - dioxane, 5-hydroxymethyl-4,5-dimethyl-meta-dioxane, and 4-hydroxymethyl-4,5-dimethyl-meta-dioxane which comprises heating a mixture containing less than 50 percent by weight of said long chain synthetic polymeric amide and more than 50 percent by weight of said hydroxymethyl-dimethyl-meta-dioxane to a temperature of from 150° C. to 180° C. with agitation for a time sufficient to produce said homogeneous composition.

7. A method for preparing homogeneous compositions of a long chain synthetic polymeric amide which has recurring amide groups as an integral part of the main polymer chain and which is capable of being formed into a filament in which the structural elements are oriented in the direction of the axis and a hydroxymethyl-dimethyl-meta-dioxane selected from the group consisting of 5-hydroxymethyl-4,4-dimethyl - meta - dioxane, 5-hydroxymethyl-4,5-dimethyl-meta-dioxane, and 4-hydroxymethyl-4,5-dimethyl-meta-dioxane which comprises heating a mixture containing more than 50 percent by weight of said long chain synthetic polymeric amide and less than 50 percent by weight of said hydroxymethyl-dimethyl-meta-dioxane to a temperature of from 150° C. to 180° C. with agitation for a time sufficient to produce said homogeneous composition.

No references cited.

UNITED STATES PATENT OFFICE

CERTIFICATE OF CORRECTION

Patent No. 3,011,989                                December 5, 1961

Donald H. Russell

It is hereby certified that error appears in the above numbered patent requiring correction and that the said Letters Patent should read as corrected below.

Column 2, line 61, for "66" read -- 6,6 --; line 62, for "610" read -- 6,10 --; column 3, line 10, for "66" read -- 6,6 --; line 12, for "610" read -- 6,10 --; same column 3, line 18, for "66/610/6" read -- 6,6/6,10/6 --.

Signed and sealed this 17th day of April 1962.

(SEAL)
Attest:

ESTON G. JOHNSON

Attesting Officer

DAVID L. LADD

Commissioner of Patents